(12) United States Patent
Stoyanov et al.

(10) Patent No.: US 11,566,535 B2
(45) Date of Patent: Jan. 31, 2023

(54) LOW FRICTION, WEAR RESISTANT VARIABLE VANE BUSHING

(71) Applicant: Raytheon Technologies Corporation, Farmington, CT (US)

(72) Inventors: Pantcho P. Stoyanov, West Hartford, CT (US); Michael D. Greenberg, Bloomfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 195 days.

(21) Appl. No.: 16/879,802

(22) Filed: May 21, 2020

(65) Prior Publication Data
US 2021/0363896 A1    Nov. 25, 2021

(51) Int. Cl.
*F01D 17/16*    (2006.01)

(52) U.S. Cl.
CPC ........ *F01D 17/162* (2013.01); *F05D 2230/31* (2013.01); *F05D 2230/313* (2013.01); *F05D 2230/314* (2013.01); *F05D 2240/12* (2013.01)

(58) Field of Classification Search
None
See application file for complete search history.

(56) References Cited

U.S. PATENT DOCUMENTS

| | | | | |
|---|---|---|---|---|
| 4,604,030 A * | 8/1986 | Naudet | ......... | F01D 11/001 415/126 |
| 5,837,331 A * | 11/1998 | Menu | ......... | H01J 9/025 427/78 |
| 6,139,261 A | 10/2000 | Bishop et al. | | |
| 6,170,990 B1 * | 1/2001 | Hawkins | ......... | F16C 33/16 384/907.1 |
| 7,247,348 B2 * | 7/2007 | Power | ......... | F01D 5/288 427/249.7 |
| 7,445,427 B2 | 11/2008 | Gutknecht et al. | | |
| 8,474,827 B2 * | 7/2013 | Grondahl | ......... | F16J 15/3292 277/411 |
| 2002/0098083 A1 * | 7/2002 | Blangetti | ......... | C23C 30/00 415/200 |
| 2006/0110246 A1 * | 5/2006 | Bruce | ......... | F04D 29/563 415/160 |
| 2007/0099027 A1 | 5/2007 | Krishnamurthy et al. | | |

FOREIGN PATENT DOCUMENTS

| | | |
|---|---|---|
| EP | 0146449 A1 | 6/1985 |
| EP | 1793090 A2 | 6/2007 |
| EP | 3748135 A1 | 12/2020 |

OTHER PUBLICATIONS

European search report for patent application No. 21175122.7 dated Oct. 8, 2021.

* cited by examiner

*Primary Examiner* — Kayla Mccaffrey
(74) *Attorney, Agent, or Firm* — Bachman & LaPointe, P.C.

(57) ABSTRACT

A variable vane assembly includes a variable vane; a trunnion arranged on one end of the variable vane; a bushing mated to the trunnion to define an interface between the trunnion and the bushing; and a surface modification on at least one of the trunnion and the bushing at the interface, whereby frictional heating at the interface during operation of the assembly is reduced.

18 Claims, 6 Drawing Sheets

LOW FRICTION, WEAR RESISTANT VARIABLE VANE BUSHING

BACKGROUND OF THE DISCLOSURE

The disclosure relates to variable vanes and vane bushings and, more particularly, to a low friction, wear resistant interface between these components.

Gas turbine engines such as those that power modern aircraft generally include a compressor section to pressurize an airflow, a combustor section to burn a hydrocarbon fuel in the presence of the pressurized air, and a turbine section to extract energy from the resultant combustion gases.

Some gas turbine engines include variable stator vanes that can be pivoted about their individual axes to change an operational performance characteristic of the engine. Typically, the variable stator vanes are robustly designed to handle the stress loads that are applied to change the position of the vanes.

Variable vanes can be operated at relatively high temperatures ranges, approaching temperatures of 700° F., and under increased vibratory motion as compared to legacy variable vanes. Under these conditions, the variable vanes and bushings with which they interact have experienced significant wear. Variable vanes and bushings can typically have an interaction that exhibits low roughness of the surfaces and variability or fluctuations in the contact pressure between the components. These conditions are not well suited to formation of a transfer film between the components, leading to long break-in periods and consequently high friction and wear.

SUMMARY OF THE INVENTION

In one non-limiting configuration, a variable vane assembly comprises a variable vane; a trunnion arranged on one end of the variable vane; a bushing mated to the trunnion to define an interface between the trunnion and the bushing; and a surface modification on at least one of the trunnion and the bushing at the interface, whereby frictional heating at the interface during operation of the assembly is reduced.

In another non-limiting configuration, the surface modification comprises an amorphous hydrogenated carbon coating.

In still another non-limiting configuration, the amorphous hydrogenated carbon coating comprises less than 30 at % hydrogen.

In a further non-limiting configuration, the amorphous hydrogenated carbon coating comprises between 3 and 30 at % hydrogen.

In a still further non-limiting configuration, the amorphous hydrogenated coating comprises less than 20 at % hydrogen.

In another non-limiting configuration, the amorphous hydrogenated carbon coating has an $sp^2$ content and an $sp^3$ content, and wherein the $sp^2$ content is greater than the $sp^3$ content.

In still another non-limiting configuration, the amorphous hydrogenated carbon coating has a ratio of $sp^2:sp^3$ of between 1.4 and 1.6.

In a further non-limiting configuration, the amorphous hydrogenated carbon coating comprises a plurality of layers including an outermost layer with reference to an underlying trunnion or bushing, and at least one bulk layer between the outermost layer and the underlying trunnion or bushing, and wherein the outermost layer has a higher $sp2:sp^3$ ratio than the at least one bulk layer.

In a still further non-limiting configuration, the assembly further comprises an adhesion layer between an underlying trunnion or bushing and the surface modification, wherein the adhesion layer enhances adhesion of the surface modification to the underlying trunnion or bushing.

In another non-limiting configuration, the adhesion layer is a different material from the surface modification.

In still another non-limiting configuration, the coating further comprises a tungsten or silicon dopant.

In a further non-limiting configuration, the coating has a thickness of between 100 and 200 nm.

In a still further non-limiting configuration, the surface modification is on the trunnion.

In another non-limiting configuration, the trunnion comprises a nickel chromium alloy material, and wherein the bushing comprises a graphite material.

In still another non-limiting configuration, the bushing comprises a molded carbon composite material.

In a further non-limiting configuration, a method for operating a variable vane assembly comprises the steps of: applying a film to at least one surface of an interface between a variable vane having a trunnion, and a bushing mated to the trunnion; and operating the assembly such that surfaces at the interface are subjected to fretting and translating contact, whereby a transfer film is generated on surfaces contacting the at least one surface, thereby reducing friction and frictional heating at the interface.

In a still further non-limiting configuration, the applying step comprises applying a surface modification to the at least one surface.

In another non-limiting configuration, the surface modification comprises an amorphous hydrogenated carbon coating comprising less than 30 at % hydrogen and has a film thickness of between 100 and 200 nm.

In still another non-limiting configuration, the amorphous hydrogenated carbon coating has an $sp^2$ content and an $sp^3$ content, and wherein the $sp^2$ content is greater than the $sp^3$ content.

In a further non-limiting configuration, the film is applied by physical vapor deposition, chemical vapor deposition, sputtering or combinations thereof.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

A detailed description of preferred embodiments of the invention follows, with referenced to the attached drawings, wherein.

Like reference numbers and designations in the various drawings indicate like elements.

DETAILED DESCRIPTION

The present disclosure relates to variable vanes and bushings and, more particularly, to an interface between these components that produces low friction, wear resistant interaction between them.

Figure 1:
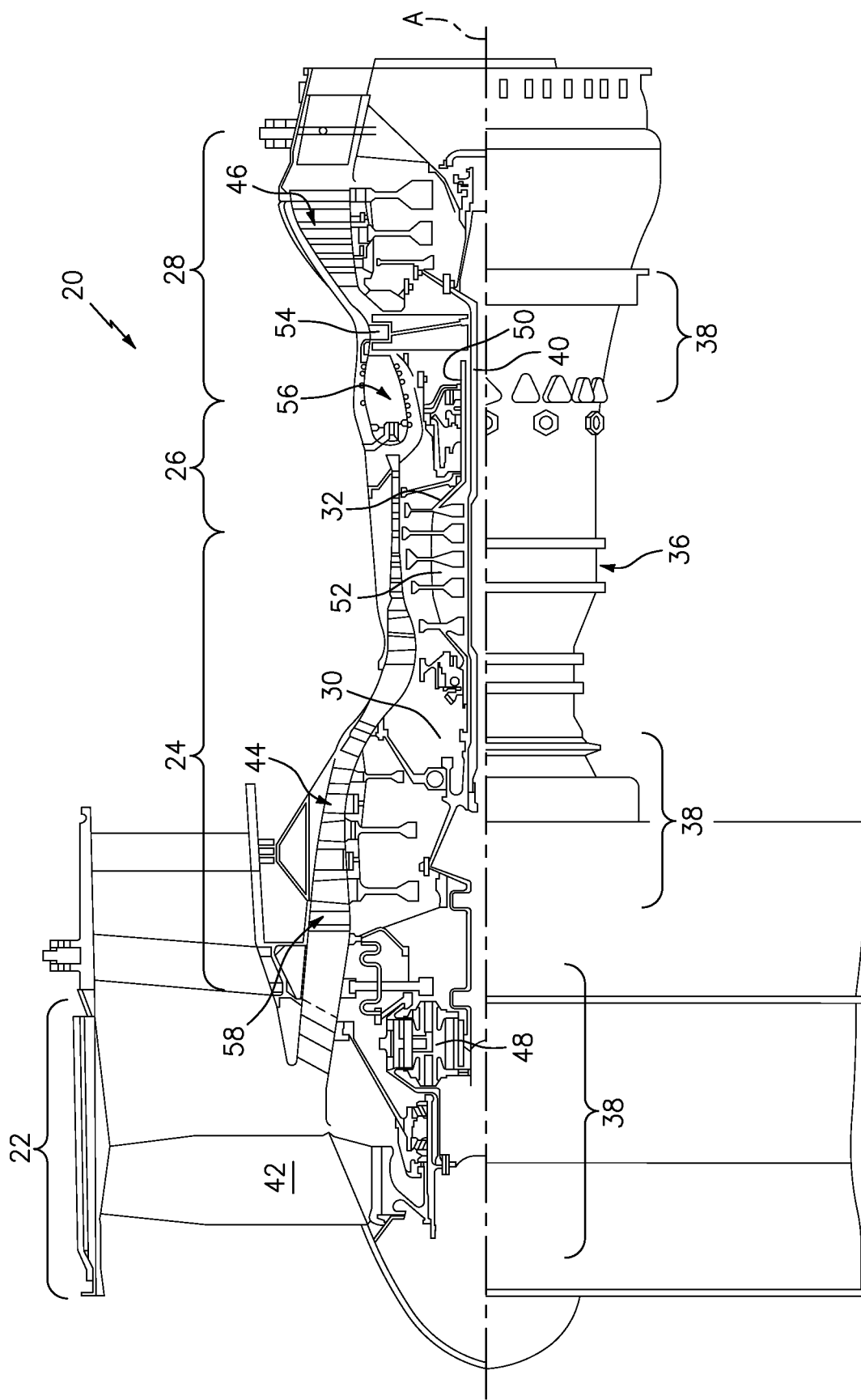
FIG. 1 is a schematic cross-section of a gas turbine engine architecture.

FIG. 1 schematically illustrates a gas turbine engine 20. The gas turbine engine 20 is disclosed herein as a two-spool geared turbofan (GTF) that generally incorporates a fan section 22, a compressor section 24, a combustor section 26 and a turbine section 28. Alternative engine architectures might include various other sections, systems or features which are not illustrated herein, and the present disclosure is readily pertinent to such alternative engine architectures.

The fan section 22 drives air along a bypass flowpath while the compressor section 24 drives air along a core flowpath for compression and communication into the combustor section 26, and then expansion through the turbine section 28. Although depicted as a GTF in the disclosed non-limiting embodiment, it should be understood that the concepts described herein are not limited to use with a GTF as the teachings may be applied to other types of turbine engines such as a direct drive turbofan with high or low bypass turbofan, turbojets, turboshafts, and three spool (plus fan) turbofans wherein an intermediate spool includes an intermediate pressure compressor (IPC) between a low pressure compressor (LPC) and a high pressure compressor (HPC), and an intermediate pressure turbine (IPT) between the high pressure turbine (HPT) and the low pressure turbine (LPT).

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 (LPC) and a low pressure turbine 46 (LPT). The inner shaft 40 drives the fan 42 directly or thru a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 (HPC) and high pressure turbine 54 (HPT). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

Variable vanes are positioned at locations along the flow path, as schematically illustrated at 58 in FIG. 1.

Figure 2:
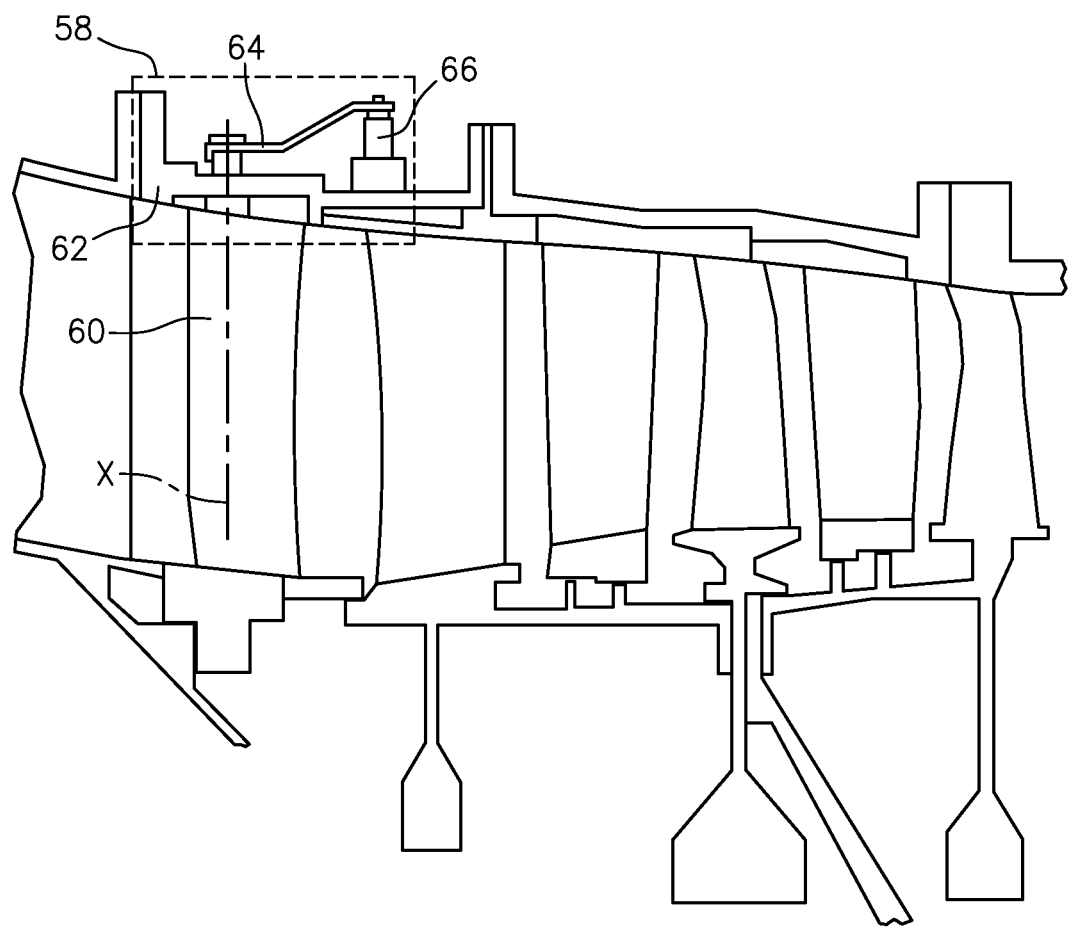
FIG. 2 is an enlarged schematic illustration of a portion of FIG. 1 showing components of a variable vane assembly.
Figure 3:
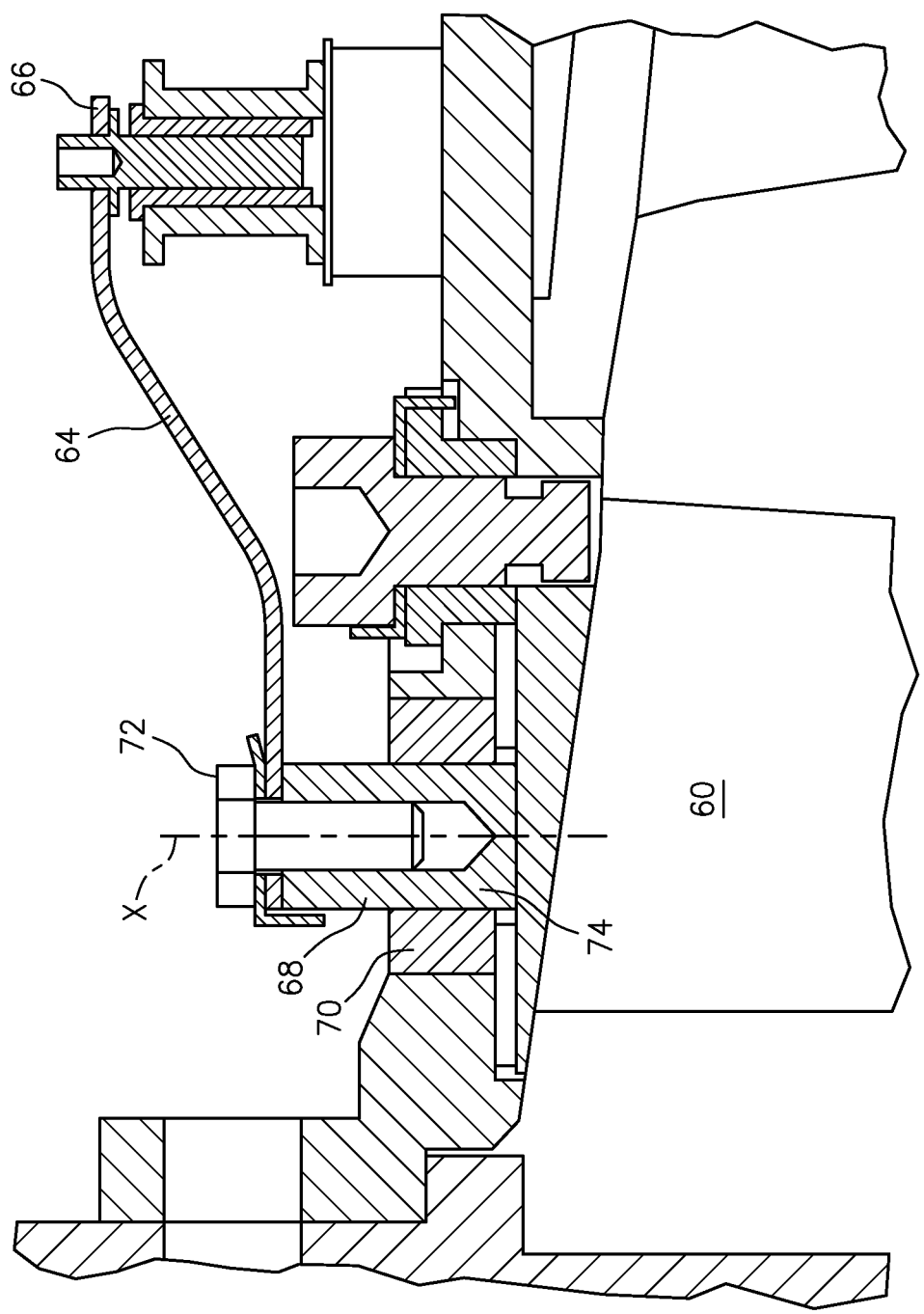
FIG. 3 is a further enlarged schematic illustration of a portion of FIG. 2 showing a non-limiting embodiment of a variable vane assembly.

FIG. 2 shows an enlarged area of FIG. 1 with the position of variable vanes 58 more clearly illustrated. FIG. 2 shows a vane 60 mounted at one end to a support 62. Vane 60 is rotatable around an axis X, and rotation is controlled by a vane arm 64 connected to vane 60 at one end and an actuator 66 at the other end. FIG. 3 further illustrates these components, and shows vane 60 with a trunnion 68 received in or mated with a bushing 70. FIG. 3 shows a fastener 72 securing vane arm 64 to trunnion 68 such that movement can be conveyed from actuator 66 through arm 64 to rotate trunnion 68 and vane 60 to a desired position.

During operation of a variable vane assembly as disclosed herein, with current and next generation engines, the variable vane assembly can be exposed to temperatures as high as 700° F., and extreme fretting and sliding contact, for example in the interface 74 between trunnion 68 and bushing 70.

As discussed above, when a gas turbine engine is operated in conditions as identified, both the trunnion and the bushing can be exposed to damaging wear due to fretting and sliding at high temperature. After use in a variable vane assembly, bushings without a coating as disclosed herein are visibly worn at both upper and lower portions. This wear is believed to be due to failure of a transfer film to form on the bushing because of the low surface roughness of these components, as well as variability and fluctuation in the contact pressure between the components. It is difficult for a transfer film to transfer under such circumstances.

Figure 4C:
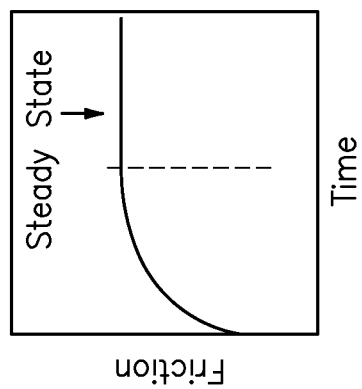
FIGS. 4a, 4b and 4c schematically illustrate surfaces of a variable vane assembly in an unworn state and a worn state, as well as the relationship of friction coefficient over time, after operation without a surface treatment as disclosed herein.
Figure 4B:
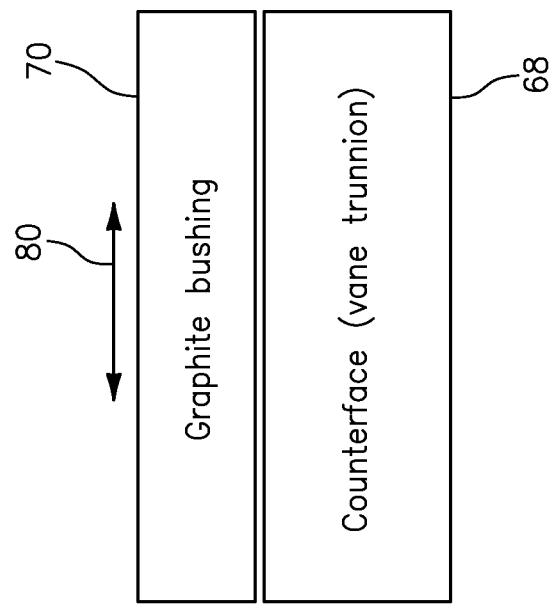
Figure 4A:
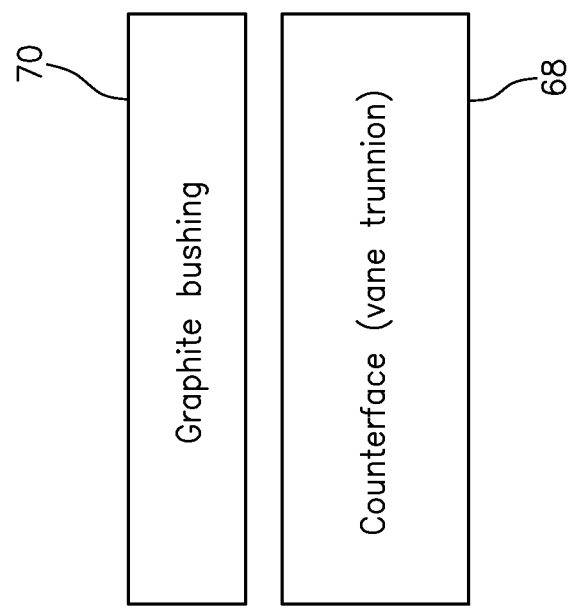

FIG. 4a schematically illustrates a mated graphite bushing 70 and a counterface or vane trunnion 68 in an unworn state. FIG. 4b shows the same surface after operation, and subjecting the bushing to fretting and sliding as shown by arrow 80. Without the formation of a transfer film, which is problematic under the expected operating conditions as stated above, a high coefficient of friction causes increase in heat at the surface which leads to excessive wearing of the respective surfaces. FIG. 4c illustrates an increasing friction coefficient at initial operation or break in operation, and reaches steady state at an elevated level.

As disclosed herein, these problems are addressed through application of a surface treatment or modification to at least one of the surfaces defining interface 74. The surface modification alters the characteristics of at least one of the surfaces to encourage formation of a transfer film of carbon, for example on the bushing, leading to reduction in the coefficient of friction as well as heat at the interface.

Figure 5C:
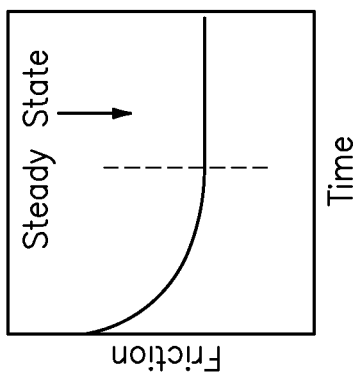
FIGS. 5a, 5b and 5c illustrate surfaces of a variable vane assembly in an unworn state and a worn state, as well as the relationship of coefficient of friction over time, after operation with a surface treatment as disclosed herein.
Figure 5B:
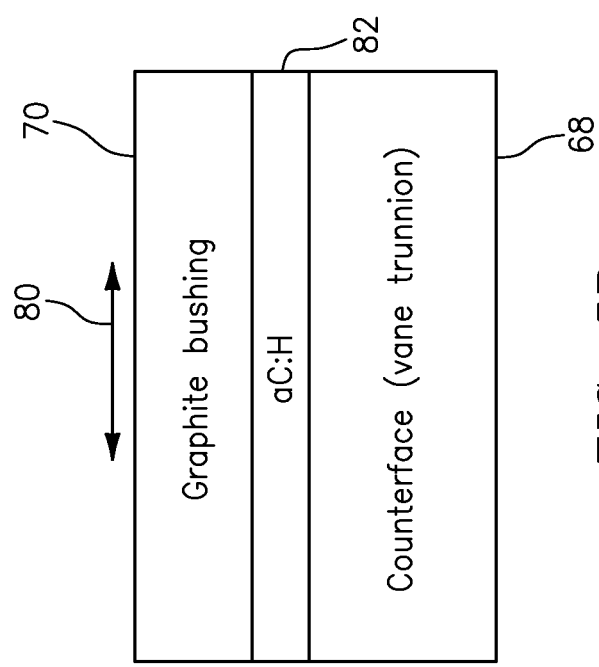
Figure 5A:
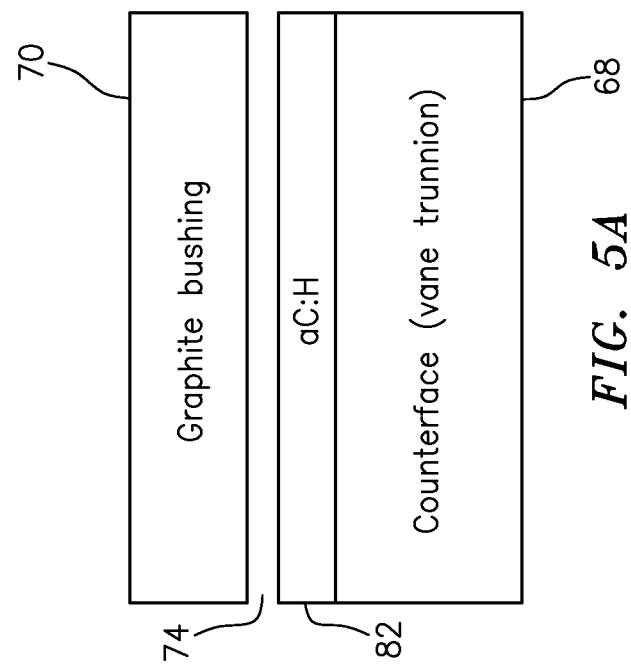

FIGS. 5a, 5b and 5c schematically illustrate interface 74 between bushing 70 and trunnion 68, with a surface modification 82 in this case applied initially to trunnion 68. FIG. 5a shows such a configuration in an unworn state. FIG. 5b illustrates interface 74 and related components in a worn state, after operation at high temperature and fretting or sliding motion (arrow 80). The surface modification 82 helps to reduce the coefficient of friction at interface 74, which in turn helps to reduce temperature at the interface, as well as excessive wear of either of the components. FIG. 5c illustrates the plot of coefficient of friction over time, and it can be seen that the relationship drops immediately and reaches steady state operation faster, and at a lower friction, than does the assembly without surface modification as illustrated in FIGS. 4a, 4b and 4c.

One non-limiting embodiment of the surface modification of the present disclosure is a coating of amorphous carbon, especially amorphous hydrogenated carbon, or aC:H. This coating can have a hydrogen content of up to about 30 at %, and in one non-limiting configuration can have a hydrogen content of at least 5 at % and up to about 30 at %. In a further non-limiting configuration, the hydrogen content can be up to about 20 at %.

Further, the amorphous hydrogenated carbon can have an $sp^2$ content that is greater than the $sp^3$ content, that is, $sp^2 > sp^3$. A ratio of $sp^2$ content:$sp^3$ content, or $sp^2$:$sp^3$ ratio, can advantageously be between 1.4 and 1.6, and one non-limiting example of a suitable ratio is 1.5.

As used herein, the term amorphous refers to a phase that is substantially without a clearly defined crystalline shape or form. It should be appreciated, however, that in the context of an amorphous hydrogenated carbon film or coating as referred to in the present disclosure, there can be some crystals or nanocrystals distributed through the film or coating, and such material overall is still considered to be within the scope of the term as used herein.

Figure 6:
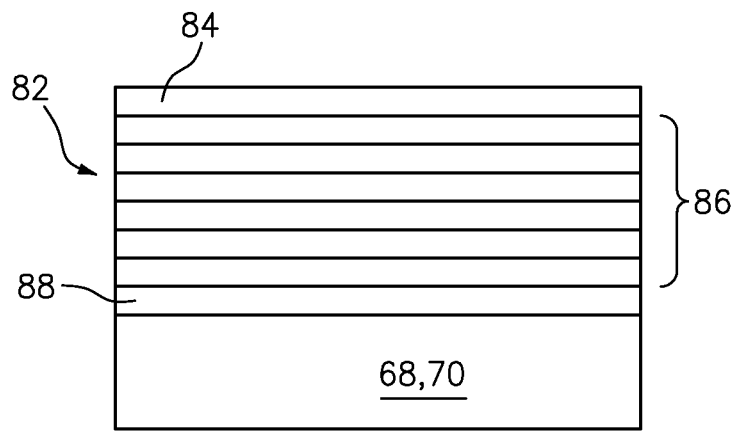
FIG. 6 illustrates a non-limiting configuration wherein the surface modification is in the form of a multilayer surface treatment.

FIG. 6 illustrates a further non-limiting configuration wherein surface modification 82 has a plurality of layers. These layers 82 can include an outermost layer 84 which is considered outermost with reference to the underlying component, be it trunnion 68 or bushing 70. Beneath outermost layer 84 are a plurality of additional layers 86 that constitute the bulk of the layers or coating. An adhesion layer 88 can also be included to enhance adhesion of surface modification 82 to the underlying trunnion 68 or bushing 70.

When a plurality of layers 84, 86 are utilized in surface modification 82, outermost layer 84 can have a higher sp2:$sp^3$ ratio than the layers 86 in the bulk of the coating. For a layered surface modification, different layers can be applied one at a time with changes in materials or application procedures to provide the desired different layer properties.

When an adhesion layer 88 is desired, suitable materials for adhesion layer 88 are different from the other coating layers, and suitable examples of material for an adhesion layer include but are not limited to titanium, aluminum and chromium based adhesive materials or layers.

Surface modification 82 can be applied to either surface of the interface 74, but generally it will be easier to apply to a non-graphitic surface, and therefore it may be desired to apply to trunnion 68. If applied to bushing 70, care must be taken to ensure material compatibility such that the coating will stay in place. Alternatively, or in addition, an adhesion layer can be utilized as set forth above.

Surface modification 82 can be applied as a film having a thickness of between 100 and 200 nm. The film can be applied using any known technique, for example by PVD, CVD sputtering the like.

Materials of trunnion 68 and bushing 70 can be any suitable material. In one non-limiting example, trunnion 68 is made from, or comprises, a nickel chromium alloy material such as IN 718 as one non-limiting example of material. Bushing 70 can be made of or comprise a graphitic material, such as molded carbon composite.

With trunnion 68 formed of a nickel chromium alloy and bushing 70 formed of molded carbon or graphite, surface modification 82 can be applied to trunnion 68 as this material can be difficult to apply to graphite. With other materials for either or both of trunnion 68 and bushing 70, it may be desirable to apply surface modification 82 to bushing 70 instead of or in addition to trunnion 68, particularly if materials are being used for the bushing that do not discourage deposition of amorphous carbon film. the configuration where bushing 70 is graphite, and surface modification 82 is applied to trunnion 68 as a thin amorphous hydrogenated carbon film, the film serves to reduce initial coefficient of friction during initial operation, and also to initiate a transfer film to bushing 70 during such initial operation or "break in", such that the coefficient of friction starts at a lower value (compare FIG. 4c and FIG. 5c), and over time the coefficient of friction decreases as shown in FIG. 5c.

In a further non-limiting configuration, it may be desired to add a dopant or other additional material to the amorphous hydrogenated carbon film. One possible additive is tungsten, which bonds with carbon and can improve the hardness and wear resistance of the material. Another possible additive is silicon, which can increase the temperature stability of the film and overall assembly by acting as a sacrificial oxidizer. It should be appreciated that other materials could be added to the film or surface modification as would be known to persons having ordinary skill in the art, for example to improve properties of the film or assembly in other respects.

Figure 7:
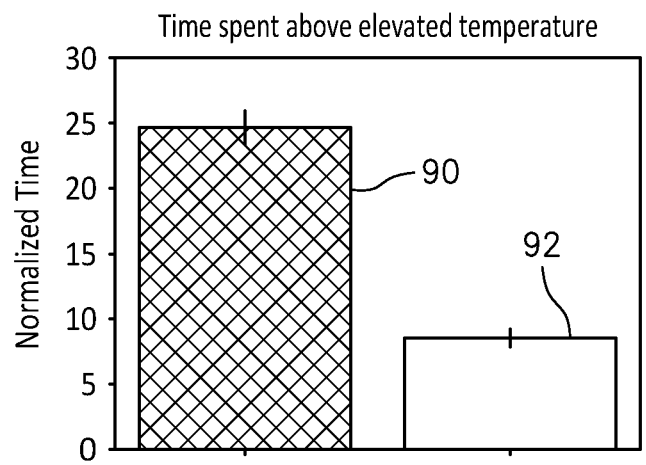
FIG. 7 illustrates time spent over an elevated temperatures during testing of an uncoated surface as compared to a surface having a surface modification as disclosed herein.
Figure 8:
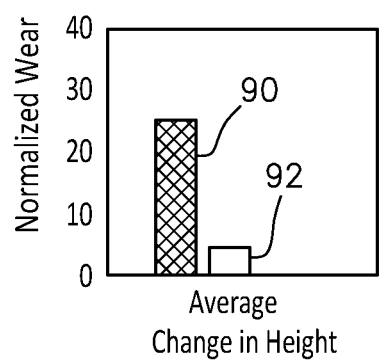
FIG. 8 illustrates wear behavior of an uncoated surface as compared to a surface having a surface modification as disclosed herein.

FIGS. 7 and 8 show results obtained performing a rig test using a coated interface, treated with a thin film of aC:H as disclosed herein and also using a non-coated interface as a baseline. The materials used for the bushing and counterface were electrographitic carbon and the coated interface was coated with an a-C:H film having a thickness of 100 nm.

At different time periods, sub-surface temperature measurements were taken for the coated and baseline systems. During initial operation, which is considered the "break in" period, temperature with the coated system starts lower, and stays lower during the subsequent measured times, demonstrating that the coated system as disclosed herein produces advantageous friction and heating characteristics during break in and also at later or steady state stages of use or operation of the system and interface. FIG. 7 shows normalized wear behavior in terms of time spent above an elevated temperature for the baseline system, shown at 90, and the coated system at 92. The coated system shows significantly less time above elevated temperature.

In addition, wear behavior was also measured during this testing by measuring height of the baseline and coated component during test operation. Measurements were taken at several locations, and an average of the wear at these locations is presented in FIG. 8. FIG. 8 shows results in terms of average change in height for the baseline system 90 and the DLC coated system 92. Change in height is reflective of loss of material due to wear, and it is clear that the wear is significantly greater for the baseline system. The system with surface modification coating as disclosed herein produces improved behavior in terms of less loss of material or height and also appreciably reduced time above elevated temperature.

It should be appreciated that the surface modification and method for operating a variable vane assembly with a surface modification as disclosed herein helps to produce a carbon transfer film to the non-treated surface and thereby create a solid lubricated system. This results in low friction and wear resistant variable vane assemblies that are capable of operating efficiently in high pressure compressors, for example. This can significantly increase the endurance life of engine components, and may also significantly reduce overhaul costs by reducing the number of parts, in particular the more expensive counterface parts (vane or vane trunnion) that are stripped due to wear and thermal damage issues caused by frictional heating.

One or more embodiments of the present disclosure have been described. Nevertheless, it will be understood that various modifications may be made without departing from the spirit and scope of the invention. For example, different materials and coating applications could be utilized, and bushing assemblies in other locations may benefit from the disclosed coating. Accordingly, other embodiments are within the scope of the following claims.

What is claimed is:

1. A variable vane assembly, comprising:
   a variable vane;
   a trunnion arranged on one end of the variable vane;
   a vane arm connected to the one end for rotating the variable vane;
   a bushing mated to the trunnion to define an interface between the trunnion and the bushing; and
   a surface modification on at least one of the trunnion and the bushing at the interface, wherein the surface modification comprises an amorphous hydrogenated carbon coating, whereby frictional heating at the interface during operation of the assembly is reduced.

2. The assembly of claim 1, wherein the amorphous hydrogenated carbon coating comprises less than 30 at % hydrogen.

3. The assembly of claim 1, wherein the amorphous hydrogenated carbon coating comprises between 3 and 30 at % hydrogen.

4. The assembly of claim 1, wherein the amorphous hydrogenated coating comprises less than 20 at % hydrogen.

5. The assembly of claim 1, wherein the amorphous hydrogenated carbon coating has an $sp^2$ content and an $sp^3$ content, and wherein the $sp^2$ content is greater than the $sp^3$ content.

6. The assembly of claim 5, wherein the amorphous hydrogenated carbon coating has a ratio of $sp^2:sp^3$ of between 1.4 and 1.6.

7. The assembly of claim 5, wherein the amorphous hydrogenated carbon coating comprises a plurality of layers including an outermost layer with reference to an underlying trunnion or bushing, and at least one bulk layer between the outermost layer and the underlying trunnion or bushing, and wherein the outermost layer has a higher $sp^2:sp^3$ ratio than the at least one bulk layer.

8. The assembly of claim 1, further comprising an adhesion layer between an underlying trunnion or bushing and the surface modification, wherein the adhesion layer enhances adhesion of the surface modification to the underlying trunnion or bushing.

9. The assembly of claim 8, wherein the adhesion layer is a different material from the surface modification.

10. The assembly of claim 1, wherein the coating further comprises a tungsten or silicon dopant.

11. The assembly of claim 1, wherein the coating has a thickness of between 100 and 200 nm.

12. The assembly of claim 1, wherein the surface modification is on the trunnion.

13. The assembly of claim 1, wherein the trunnion comprises a nickel chromium alloy material, and wherein the bushing comprises a graphite material.

14. The assembly of claim 1, wherein the bushing comprises a molded carbon composite material.

15. A method for operating a variable vane assembly, comprising the steps of:
    applying a film to at least one surface of an interface between a variable vane having a trunnion at one end, a vane arm connected to the one end for rotating the variable vane, and a bushing mated to the trunnion;
    operating the assembly such that surfaces at the interface are subjected to fretting and translating contact, whereby a transfer film is generated on surfaces contacting the at least one surface, thereby reducing friction and frictional heating at the interface, wherein the applying step comprises applying a surface modification to the at least one surface, and wherein the surface modification comprises an amorphous hydrogenated carbon coating.

16. The method of claim 15, wherein the amorphous hydrogenated carbon coating comprises less than 30 at % hydrogen and has a film thickness of between 100 and 200 nm.

17. The method of claim 16, wherein the amorphous hydrogenated carbon coating has an $sp^2$ content and an spa content, and wherein the $sp^2$ content is greater than the spa content.

18. The method of claim 15, wherein the film is applied by physical vapor deposition, chemical vapor deposition, sputtering or combinations thereof.

* * * * *